United States Patent
Arrowood et al.

[11] Patent Number: 5,987,521
[45] Date of Patent: *Nov. 16, 1999

[54] MANAGEMENT OF PATH ROUTING IN PACKET COMMUNICATIONS NETWORKS

[75] Inventors: Andrew Hilliard Arrowood, Raleigh; Charles A. Carriker, Jr., Cary; Anne Siegman Magnuson, Raleigh; Sharon Marie McClernan, Cary; Laura Marie Petri, Cary; Leo Temoshenko, Raleigh, all of N.C.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/500,675

[22] Filed: Jul. 10, 1995

[51] Int. Cl.⁶ ................................................ G06F 15/16
[52] U.S. Cl. ...................... 709/239; 709/243; 709/244
[58] Field of Search ...................... 395/800, 200.02, 395/200.09, 200.1, 200.11, 200.13, 200.15, 200.5, 200.54, 200, 57, 200.68, 200.69, 200.72, 200.74; 709/238, 239, 242, 243, 244, 223, 224; 340/825, 825.03, 826, 827, 825.06, 825.16, 825.79, 825.8; 370/216–228, 254, 351–366, 396, 398, 400–410, 422–426; 359/117; 710/131; 714/2, 48

[56] References Cited

U.S. PATENT DOCUMENTS

| | | | |
|---|---|---|---|
| 4,825,206 | 4/1989 | Brice et al. | 340/825.02 |
| 5,068,892 | 11/1991 | Livanos | 379/221 |
| 5,117,422 | 5/1992 | Hauptschein et al. | 370/255 |
| 5,202,985 | 4/1993 | Goyal | 707/4 |
| 5,233,604 | 8/1993 | Ahmadi et al. | 370/238 |
| 5,297,137 | 3/1994 | Ofek et al. | 370/403 |
| 5,303,235 | 4/1994 | Chan et al. | 370/254 |

FOREIGN PATENT DOCUMENTS 0258654  9/1988  European Pat. Off. ......... H04Q 3/66

OTHER PUBLICATIONS

Computer Communications Review, vol. 20, No. 4, Sep. 1, 1990, pp. 231–241.
IEEE Comm. Magazine, vol. 24, No. 1, Jan. 1986, pp. 34–38.
European Search Report.

*Primary Examiner*—John A. Follansbee
*Attorney, Agent, or Firm*—Gerald R. Woods; John J. Timar

[57] ABSTRACT

A packet communications network includes a route management system in which routes can be remotely changed by using a simple set command to set a data value in the originating or terminating node of the route. Storage tables in the originating and destination nodes record the route changes and administrative data concerning the route. This administrative data can be retrieved from the originating node by simple get or get-next commands. The administrative data can include the specific specification of the route in links, the time of creation of the route, the route replaced and the reason for initiating the change in route. Together these capabilities permit centralized management of route changes in the entire network from a single manager node, and using only simple set, get and get-next command structures.

18 Claims, 4 Drawing Sheets

| PATH INDEX | TIME STAMP | PATH IDENTIFICATION | OLD PATH | NEW PATH | REASON | RESULT |
|---|---|---|---|---|---|---|
| 40 | 41 | 42 | 43 | 44 | 45 | 46 |

MANAGEMENT OF PATH ROUTING IN PACKET COMMUNICATIONS NETWORKS

TECHNICAL FIELD

This invention relates to packet communications systems and, more particularly, to methods and apparatus for the central management of routing paths in such systems.

BACKGROUND OF THE INVENTION

The supervision of packet transmission networks is typically assigned to one individual with special skills in network management. Such network supervisors typically are located at one node of the network and have the responsibility of insuring the proper operation of the network to insure network services to all users of the network. Many supervisory functions, however, must take place at other nodes of the network. The establishment of connections, and the testing of those connections, for example, must be initiated by one of the nodes in the route of the connection, typically the source node. In order to centrally manage the establishment, discontinuation and restoral of routes or paths through the network for the transmission of data between users of the network, is therefore necessary to provide a mechanism for remotely monitoring, establishing, terminating and reassigning such routes from a centrally located supervisory or manager node in the network. The central node is typically called the Manager node and all other nodes are called Agent nodes. Routes between Agent nodes are created at the originating Agent node of the route and such nodes are specified either by the name of the destination node (called a named route), or by the specification of the sequence of nodes and transmission links making up the route (called a connection route). In either case, it is desirable to set up routes remotely from a centralized manager node to accommodate link failures, congestion or the need to take resources out of service.

The most common control command mechanism available for managing packet networks from a central location utilizes "SET" (set a value from a remote location) and "GET" or "GET_NEXT" (retrieve a value from a remote location) commands. One such command structure is known as the Simple Network Management Protocol (SNMP). In the SNMP system, a simple "GET" or "GET_NEXT" command is used to obtain a single value from a remote node in the packet network. Similarly, a simple "SET" command is used to set a single value in a remote node of the packet network. Unfortunately, this simple command structure does not lend itself well to creation, deletion and alteration of routes as is necessary for overall route management. In the prior art systems utilizing such a limited command structure, it is difficult or impossible to centrally manage route changes in the entire packet transmission system. Without central management, each node must manage all of the routes originating at that node, requiring duplication of the management facilities at each of the nodes, thereby increasing the cost and complexity and reducing the throughput of the network.

Attempts to centrally manage routing paths using these standard manager-agent interaction commands suffers from a number of problems. The network manager, for example, has no way of knowing which routes have been changed dynamically due to a transmission or device failure, or how often such changes have occurred. Similarly, the network administrator has no way to initiate the re-calculation of a route after a failed resource has been restored to service, or to specify that a certain route be used.

SUMMARY OF THE INVENTION

In accordance with the illustrative embodiment of the present invention, a path management system is provided which provides central management of connection routing in systems having a limited protocol control command structure. More particularly, a data object called a path object is defined as a read-write data value and is specified for each path originating at a particular node. A table of such path objects, called the path table, is established in each Agent node of the network. These data objects, which can be set to any desired value remotely by use of a "SET" command, are used to initiate the creation or deletion of data routes. That is, each path data object is monitored by the local Agent node and, when a change in value is detected, a new path is generated, identified by the new value in the path data object. Each path data object in the path table includes fields identifying the identification of the path, the route of the path, and administrative information such as, for example, the number of packets traveling in each direction on that path.

In further accord with the present invention, a path status data table is maintained at all of the Agent nodes which are end-points of path routes. A new status entry in the path status table is created each time a route is deleted or modified. Each status entry in the path status table contains a plurality of fields specifying the identification of the path, the time of establishment, the route of the old path, the route of the new path, the reason for the new path being created, and the result of the attempt to create the path, i.e., success or failure. A new entry is created in the path status table, not only when the centralized path Manager node directs the creation of a new path, but also when the new path is created in response to the Agent node's own path creation algorithms.

The Manager node, Agent node interactions are entirely independent of the supervisory control command structure used. As suggested above, the SMNP management protocol can be used. Other management command structures can also be used, including the Common Management Information Protocol (CMIP), the System Network Administration, Management Services (SNA/MS) protocol, and many other proprietary command protocols.

A further advantage of the present invention is the independence of the route management system from the actual routing protocols used by the Agent nodes. Indeed, different nodes could use different routing algorithms and still participate in the centralized routing management system of the present invention. For example, the High Performance Routing (HPR) protocol can be used, as well as other Link State routing protocols such as the Advanced Peer-to-Peer Networking (APPN) protocol, the Open Shortest Path First (OSPF) protocol, used by the Transmission Control Program, Internet Protocol (TCP/IP), and the Intermediate System to Intermediate System (IS-IS) protocol, used by Open Systems Interconnect (OSI) and TCP/IP.

It can be seen that the path management techniques of the present invention make it possible to centrally manage all of the routes in an entire packet network from a single route management node, using only a simple SNMP-like command structure. This centralized route management reduces duplication, cost, and complexity of the route management function.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
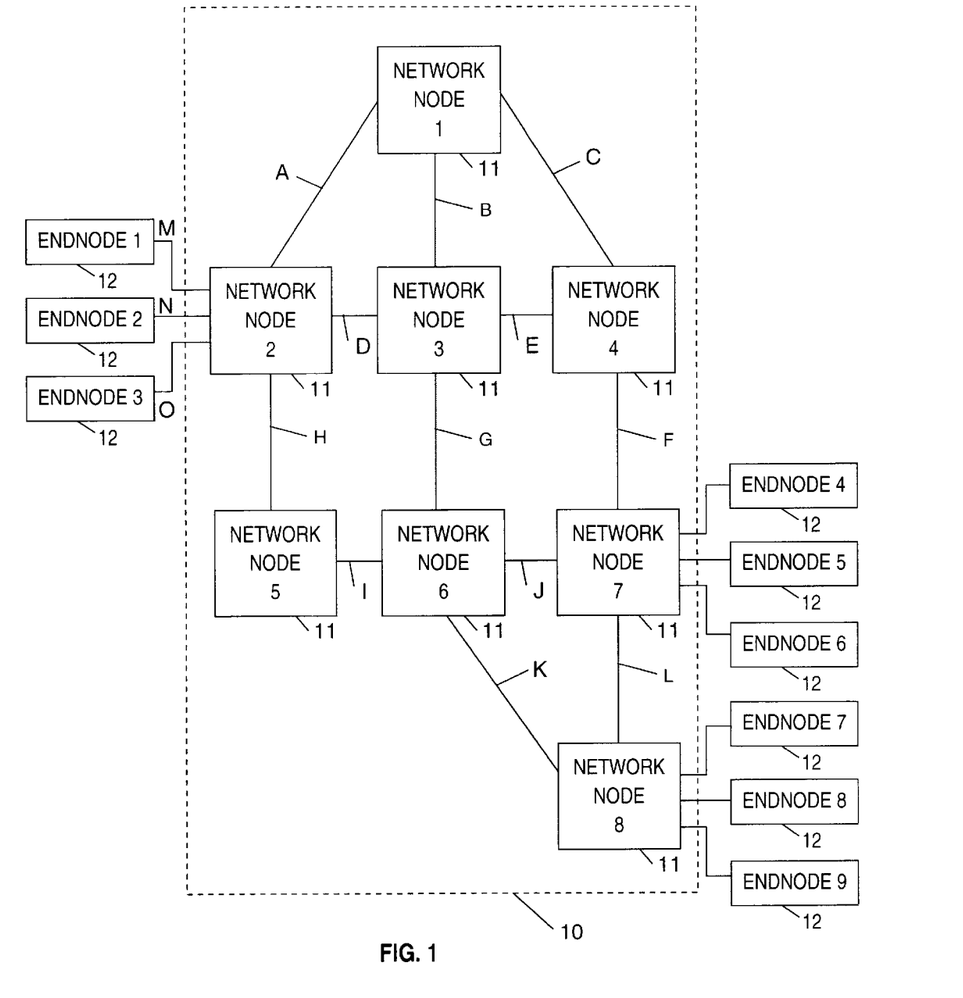
FIG. 1 shows a general block diagram of a packet communications network in which a centralized route management system in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node. In accordance with the present invention, one or more of network nodes 11 can also comprise a centralized route management system.

Each of end nodes 12 comprises either a source of digital data to be transmitted to another end node, a utilization device for consuming digital data received from another end node, or both. Users of the packet communications network 10 of FIG. 1 may utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available on each leg of the new connection. One such optimal route calculating systems is disclosed in U.S. Pat. No. 5,233,604 granted Aug. 3, 1993. Once such a route is calculated, a connection request message is launched on the network, following the computed route and updating the bandwidth occupancy of each link along the route to reflect the new connection. Data packets may then be transmitted along the calculated route from the originating node to the destination node (and from the destination node to the originating node) by placing this route in the header of the data packet.

Figure 2:
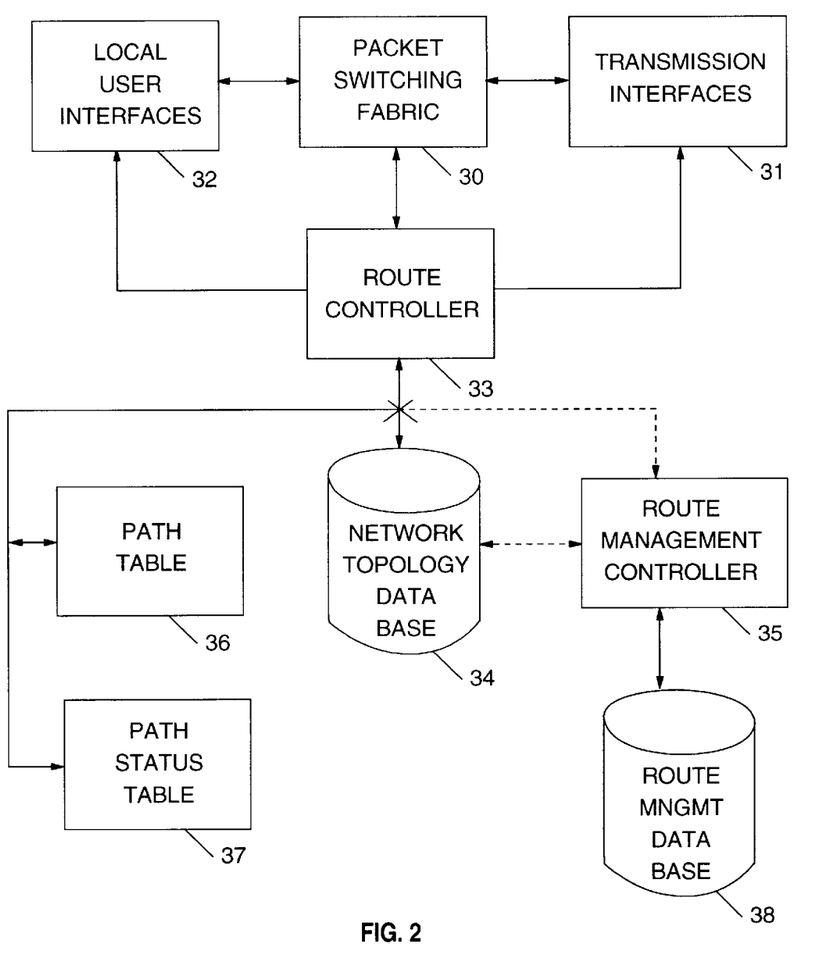
FIG. 2 shows a more detailed block diagram of typical decision point in the network of FIG. 1 at which point packets may enter the network or be forwarded along the route to a destination for each packet, and in which route creation facilities as well as a route management system in accordance with the present invention might find use.

In FIG. 2 there is shown a general block diagram of a network node control circuit which might be found in the nodes 11 of FIG. 1. The node control circuit of FIG. 2 comprises a high speed packet switching fabric 30 onto which packets arriving at the node are entered. Such packets arrive over transmission links from other nodes of the network, such as links A–L of FIG. 1 via transmission interfaces 31, or are originated locally via local user interfaces 30. Switching fabric 30, under the control of route controller 33, connects each of the incoming data packets to the appropriate one of the outgoing transmission link interfaces 31 or to the appropriate one of the local user interfaces 32, all in accordance with well known packet network operations. Indeed, network management control messages are also launched on, and received from, the packet network in the same fashion as data packets. That is, each network packet, data or control message, transmitted on the network of FIG. 1 is routed by way of switching fabric 30, as shown in FIG. 2.

The route controller 33 is used to calculate optimum routes for messages originating at the node of FIG. 2. Controller 33 can, for example, use updated information in network topology data base 34 to calculate the optimum route using an algorithm such as that described in the afore-mentioned patent U.S. Pat. No. 5,233,604. Once calculated, such optimum routes are stored locally at the node of FIG. 2 and used by route controller 33 to add this route to the header of all data packets to be forwarded to this destination. It can be seen that each and every packet launched from this node on the pre-calculated route to the desired destination follows the same identical path under the control of a pre-calculated routing vector stored in FIG. 2.

Occasionally, it becomes desirable to change these pre-calculated paths due to failures, congestion, et cetera. For example, if the performance of a particular route suddenly deteriorates or fails, it may be desirable to calculate a new route from this originating node to the same destination node, hopefully without the deficiencies of the original route. This route change may become necessary due to the fact that a particular network resource has been taken out or service (or placed in service), and hence different resources are now available for making up the route.

In accordance with the present invention, a route management controller 35 is provided at the node of FIG. 2 to centrally manage the establishment and termination of all of the routing protocol paths of the network of FIG. 1. The connections of route management controller 35 are shown in dotted lines to indicate that not all of the network nodes 11 (FIG. 1) need be equipped with a route management controller 35. Indeed, only one of network nodes 11 need be equipped with a route management controller 35, and that one network node be responsible for managing the routing protocol paths originating at all of the network nodes 11 of FIG. 1. Alternatively, a plurality of network nodes 11 can be equipped with route management controllers 35, but with only one of the controllers 35 enabled at one time, thus providing backup redundancy. Indeed, each and every node 11 can be fully equipped with the capability for network route management, but only one enabled at a time. In any event, the node currently assigned the test management function is known as the "Manager" node while all other nodes of the network are know as "Agent" nodes. A route management data base 38 is provided in the Manager node to store the route management information.

In further accord with the present invention, a path table 36 is included in each and every Agent node. Path table 36 contains a plurality of entries, one for each active route originating or terminating at this node. As will be described in detail in connection with FIG. 3, each path table entry uniquely identifies the path it represents, specifies the elements of the path, i.e., the links and nodes, and their sequence, which make up the path. Other administrative information concerning the path, such as traffic density, can also be included in each entry in path table 36. The entries of table 36 can be read from remote locations, using a simple "GET" or "GET_NEXT" command structure such as in SNMP.

Figure 3:
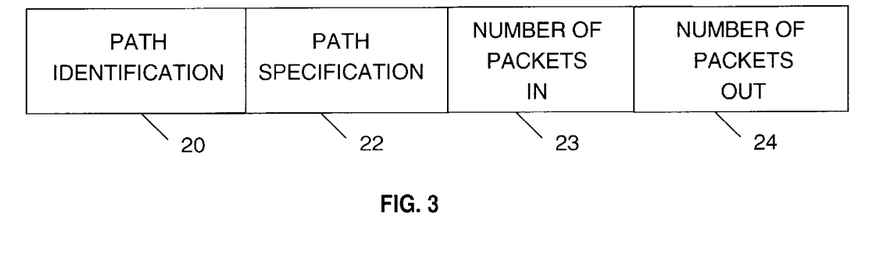
FIG. 3 shows a graphical representation of one entry in a path table in the node creating new paths, and used by the route management system shown in FIG. 2 to initiate new paths.

In accordance with the present invention, a plurality of path data objects at each Agent node are defined which can be set to a particular value by a remotely initiated "SET" command. The values in these path data objects are continuously monitored and, if any change occurs, the route controller 33 initiates the creation of a new path, identified by the new value in the path data object. An entry is made in the path table 36 for each new path created, using the new path identification from the changed path object. An entry is made in the path table for paths created dynamically at the Agent node due to the path routing algorithm of the Agent node, as well as when path creation is initiated by a remote (Manager node initiated) change in the path data object. Paths which can be identified in the path data object include point-to-point paths, identified only by the named destination node, and called a named destination route, and connection routes where each leg (transmission link) of the path is separately identified, and called a connection route.

In further accord with the present invention, each and every Agent node also includes a path status table 37. As will be discussed in detail in connection with FIG. 4, each entry in path status table contains information about the status of each of the paths identified in table 36. When a new path is created, as represented by a change to the path specification object (field 22, FIG. 3) in an entry of the path table 36, a new path status entry is made in path status table 37, containing details about the path such as the time of initiation, the specifics of both the old path and the new path, the reason for the change and the success or failure of the path creation process. These contents will be described in more detail in connection with FIG. 4.

Figure 5:
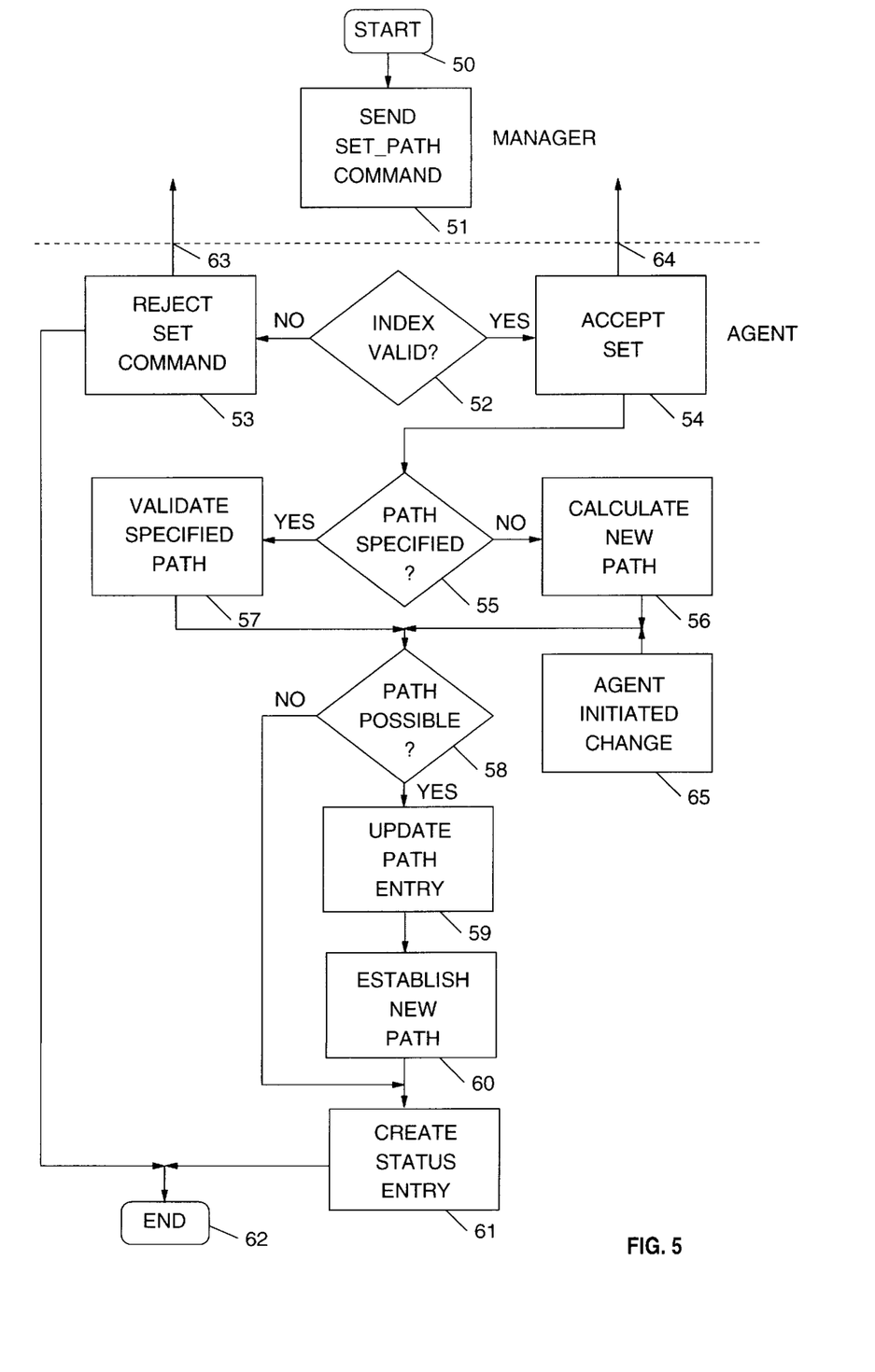
FIG. 5 shows a general flow chart of the process for initiating a path change from a centralized management node using a path table entry of FIG. 3 in accordance with the present invention.
Figure 6:
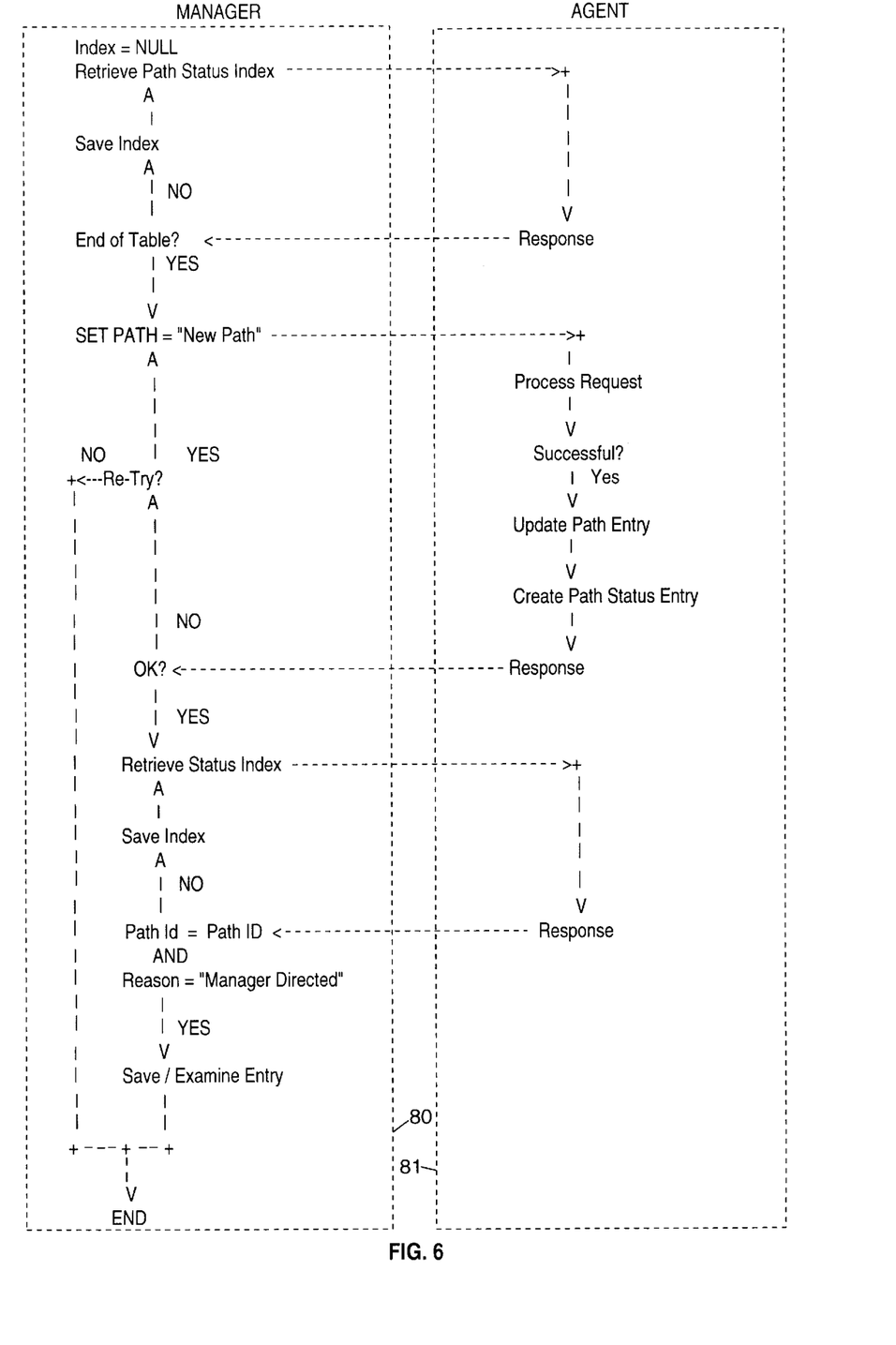
FIG. 6, shows a detailed flow chart of a typical process used for remotely directing a path switch in the network of FIG. 1 in accordance with the present invention.

Before proceeding to FIG. 3, it should be noted that the circuits of FIG. 2 can be realized as special purpose circuitry. In the preferred embodiment, however, all of the control functions described in connection with FIGS. 5 through 7 are realized by programming a general purpose computer.

The preparation of the programs necessary to accomplish these functions are obvious to persons of ordinary skill in the programmed packet network node art, particularly in view of the detailed flow charts to be described in connection with FIGS. 5 through 7.

In FIG. 3 there is shown a graphical representation of a single entry in a path table corresponding to the path table 36 of FIG. 2. In accordance with the present invention, the storage facilities in each of the Agent nodes 11 (FIG. 1) each include two tables, a path table 36 and a path status table 37. As noted above, the path table contains an entry for each route originating or terminating at that Agent node, each entry having the format described in connection with FIG. 3. The path status table also contains an entry for each route originating or terminating at that Agent node, and having the format described in connection with FIG. 4. In accordance with the present invention, all of the locally initiated paths can be managed from the Manager node by simple "SET," "GET" or "GET_NEXT" commands issued from the centralized route management controller 35 in the Manager node and operative to set or retrieve entries in tables 36 and 37 in each of the Agent nodes 11 of the network of FIG. 1.

Returning to the page table entry of FIG. 3, the first field 20 of the path table entry is a path identification number. This path identification field 20 serves to uniquely identify each of the entries in the path table 36. Since there is one such entry for each of the paths originating or terminating at the Agent node at which the path table is stored, the path identification field 20 also serves to identify the paths themselves. The second field 22 of the path table comprises an identification of the actual route followed by the path, i.e., a hop-by-hop identification of the links and nodes along this path. Fields 23 and 24 contain useful administrative information about this path. For example, in FIG. 3, field 23 contains a count of the number of packets coming into this node on this path, and field 24 contains a count of the number of packets leaving this node on this path. This information is useful to determine path usage, and hence the need to create a new path (if the usage is unexpectedly high, for example).

The contents of field 22 of the path table of FIG. 3 acts as a trigger for initiating an attempt to create a new path or route to the destination node. That is, if the contents of field 22 are changed, for example, by a "SET" command from a remote Manager Node, the route controller 33 (FIG. 2) will attempt to create a new route from this Agent node to the destination Agent node. If the contents of field 22 are changed to the specification of a new path, route controller 33 will attempt to create a route corresponding to this new path specification. If the contents of field 22 are left empty, controller 33 will attempt to create a new path to the destination node using its own routing algorithm. It can thus be seen that the path specification fields 22 in the path tables 36 in all of the Agent nodes of the network of FIG. 1 provide a mechanism for remotely changing data routes through the network from a Manager node and thus allow the central management of path changes in accordance with the present invention. It should be noted, however, that the path table 36 will also reflect changes in the paths due to the normal operation of the Agent routing protocols initiated at the Agent node.

Figure 4:
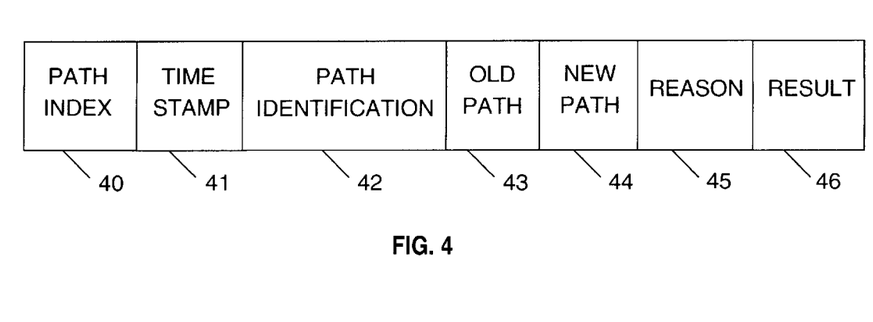
FIG. 4 shows a graphical representation of one entry in a path status table used by the route management system shown in FIG. 2 to recover information concerning each path in the network of FIG. 1.

In FIG. 4 there is shown a graphical representation of a single entry in the path status table 37 in a local Agent node. A new entry is created for the path status table 37 every time an attempt is made to change the path specification field 22 of FIG. 3 of one entry in the path table 36 of FIG. 2. As noted above, a change in a path specification field 22 (FIG. 3) of the path table 36 (FIG. 2) of an Agent node can be initiated in response to a "SET" command from a Manager node, or in response to Agent routing algorithms responding automatically to failures in the network. The path status table, like the path table 36, contains one entry for each path originating or terminating at that local Agent node. The path status table entry of FIG. 4 includes an event index field 40 containing a unique sequence number identifying the order in which path change attempts have occurred. A time stamp field 41, in turn, contains the time at which this path change attempt occurred. The path identification field 42 contains a unique value which identifies a path and corresponds directly to the path index (field 40, FIG. 3) in the path table. This path identification object is used to associate entries in the path status table with the entries in the path table. Old path field 43 contains a copy of the path specification field 22 (FIG. 3) for this path immediately prior to the time when a path change is attempted. It is a hop-by-hop identification of the links and nodes along that path. New path field 44 also contains a link-by-link identification of the path from the originating node to the destination node. Field 44 is empty if the new path cannot be calculated by the Agent routing protocol. The value in new path field 44 may even be the same as the value in old path field 43 if, for example, the Agent routing protocol calculated the same route from the originating node to the destination node because no better route was available. Field 45 contains the reason for this path change, i.e., initiated by the remote Manager node or initiated locally by normal routing protocol decisions. Finally, field 46 contains the results of this attempt to alter the route, i.e., successfully altered the route, or failed to change the route.

It can be seen that the table entries of FIGS. 3 and 4 capture all of the significant parameters involved in changes in paths originating at the node containing those tables. Moreover, such path changes can be initiated by simply setting a value in a path specification field 22 at the originating or terminating node for that path. Since such value setting operation can be carried out from a remote Manager node, the control of such path changes can be centralized at the Manager node for all paths in the network, thereby concentrating the path analysis capability and the path analysis personnel at one centralized Manager node. The detailed processes for carrying out these centralized path change management functions are illustrated in FIGS. 5 and 6.

Referring more particularly to FIG. 5, there is shown a detailed flow chart of the process for initiating a path change in accordance with the present invention. Starting in start box 50, box 51 is entered where a "SET_PATH" command is launched from the Manager node. The "SET_PATH" command includes an index which specifies a particular entry in the path table 36 in the Agent node to which it is directed, and a path specification value to be substituted for the contents of field 22 (FIG. 3) in the identified entry. As noted above, the path specification value may be null if it is desired that the Agent routing algorithm calculate the new path. The "SET_PATH" command is transmitted to the desired Agent node, using an appropriate header for the command. At the remote Agent node, decision box 52 is entered where it is determined whether or not the index (entry identifier) in the command is valid, that is, if an entry exists corresponding to this index. If not, box 53 is entered where the "SET" command is rejected and the Manager node notified, by way of arrow 63.

If the index is valid, as determined by decision box 52, box 54 is entered where the "SET" command is accepted and the Manager node notified of that fact, using arrow 64. After the Agent node accepts the "SET" command in box 54, decision box 55 is entered where it is determined whether or not a path was specified in the "SET" command. If a path is specified in the "SET" command, box 57 is entered to validate the existing path specification. If a path is not specified in the "SET" command, box 56 is entered to calculate a new path to the destination route. In either event, decision box 58 is entered to determine if the path is possible, i.e., did the path calculation terminate successfully or was the existing path validated. If not, a status table entry to that effect is made in box 61 and the process is terminated in box 62.

If the path is successfully calculated, or successfully validated, as determined by decision box 58, box 59 is entered where the path specification entry (field 22, FIG. 3) entry in path table 36 is updated with the new path. Box 60 is then entered to actually establish the calculated or validated path. Box 61 is then entered to create a new entry in the path status table 37 (FIG. 2) recording all of the information specified in FIG. 4. The process of FIG. 5 then terminates in end box 62.

If a path change is to be initiated independently by the Agent node due to the normal operation of its routing algorithm, as indicated in box 65, box 56 is entered to calculate a new route. The process thereafter continues as described above. It should be noted, as described above, that a route change can be initiated from either end of the route. The path status table entries will be kept in the Agent node initiating the change. Route changes initiated at one end of the route are also recorded at the Agent node at the other end of the route in the normal operation of the path change process. The local Agent node can also initiate a path change, as shown in box 65, by prescribing a new route for a connection. Box 58 is then entered to test the prescribed route for feasibility and processing as shown in the balance of FIG. 5.

It will be noted that the "SET" command used in FIG. 5 does not require any type of time-out, unlike the "GET" commands used in the prior art to initiate route changes. Moreover, the results of the attempt to create a new path are stored at the originating or terminating node of the path and thus are available whenever the Manager node desires to retrieve these results, using a "GET" or "GET_NEXT" command. The path change results therefore cannot be lost due to a time-out caused by congestion, bursts of high priority traffic, or other faults or interference with transmission. The contents of the path table 36 and the contents of status table 37 can be retrieved by the Manager node by the use of "GET" or "GET_NEXT" commands well known to those skilled in this art. Since the process of retrieving an entry in a table, or an entire table, by means of "GET" or "GET_NEXT" commands is well known in the prior art, it will not be further described here.

In order to better understand the operation of the present invention, a detailed example of a typical sequence of path management commands will be discussed in connection with FIG. 6. FIG. 6 represents a flow chart of the detailed exchange of messages between a Manager node 80 and an Agent node 81 in the process of route management in the network of FIG. 1. In FIG. 6, the left hand dashed box contains all actions taking place at the Manager node 80 and the right hand dashed box contains all actions taking place at the Agent node 81. As noted above, the path index field 40 of FIG. 4 contains a sequence number identifying the path status table entry. These path index field values may simply be sequential index numbers assigned as the entries are created.

Before initiating a path change for a particular route, it is desirable that the Manager node 80 ascertain an appropriate path status table entry (index number) for the new path change to be proposed. In FIG. 6, the Manager node first sets the Index value of a "GET_NEXT" command to "NULL." By convention, a request for a path status table entry is accompanied by the index number of the most recently used index number and returns the index number of the next entry location in the path status table. A request for the next index number with a value of null is answered by the return of the index number of the first entry in the path status table. When this response is received, it is tested to see if it is an end-of-table mark. If not the index is saved and used for a new request for a path status table index number. This request-response process is repeated until the end-of-table mark is received. At that point, a "SET_PATH" command is transmitted from the Manager node with the new path identification. When received, this "SET_PATH" command is processed as described in connection with FIG. 5 to create the path successfully, update the path entry and create a path status entry with the path identification specified in the "SET_PATH" command. The results (success or failure) of this attempt to create a new path is then returned to the Manager node.

If the attempt to create the new path fails, the Manager node can re-try to change the path and, after a fixed number unsuccessful re-tries, terminate the process. If, however, the attempt to create a new path is successful, the Manager node issues a command to retrieve the resulting path status table entry. If the response to the command includes a path identification (field 42, FIG. 4) corresponding to the path for which the change was requested, AND if the reason for the successful path change was "MANAGER DIRECT," i.e., under the direction of the Manager node (fields 45 and 46 of FIG. 4), the retrieved path status table entry is examined to determine, for example, the appropriateness of the detailed new path (field 44, FIG. 4). The status table entry is then stored at the Manager node for later use and the process is terminated at the Manager node.

It can be seen that the process of FIG. 6 serves to remotely initiate path changes in a packet transmission network and to retrieve the detailed results of these path changes at a central route control management system located at one node of the network. This centralized route management control, in turn, reduces the cost and complexity of path management, and allows highly redundant path management capacity.

What is claimed is:

1. A distributed packet communications network comprising:

a plurality of network nodes interconnected by transmission links, one of said network nodes being designated as a manager node, all other network nodes being designated as agent nodes;

a route controller at each network node for determining and changing routes through said network from source agent nodes to corresponding destination agent nodes in said network, said source agent nodes and said destination agent nodes comprising the endpoints of said routes;

a topology data base at said manager node for storing information concerning said plurality of network nodes and said plurality of transmission links, said topology data base information being used by said route controller in said manager node for determining said routes;

a route management controller at said manager node for centrally managing changes to said routes by remotely setting a value in a predetermined range of values in at least one agent node;

a route management data base in said manager node to store the route management information;

a path table at each agent node for initiating each path change to any route originating at said each agent node in response to said remotely set values; and a path status table at each agent node for storing the results of each path change to any route originating at said each agent node;

wherein said route management controller remotely sets a second value in at least one agent node outside the predetermined range of values to authorize said agent node to determine a new route from said at least one agent node to a corresponding destination agent node.

2. The packet communications network of claim 1 wherein said path table at each agent node contains for each path originating or terminating at said agent node a path identification field, a path specification field, a packets in field, and a packets out field.

3. The packet communications network of claim 2 wherein said path specification field contains an identification of each transmission link and network node along the route.

4. The packet communications network of claim 2 wherein said packets in and said packets out fields provide a count of a total number of packets entering and leaving said each agent node along said route and which is monitored by said manager node to initiate path changes in said at least one agent node.

5. The packet communications network of claim 1 wherein said path status table at each agent node contains for each path originating or terminating at said agent node a path index field, a time stamp field, a path identification field, an old path field, a new path field, a reason field, and a result field.

6. The packet communications network of claim 5 wherein said path index field contains a sequence number that identifies an order in which attempts to change paths have occurred.

7. The packet communications network of claim 5 wherein said path identification field is used to correlate entries in said path table with corresponding entries in said path status table.

8. The packet communications network of claim 5 wherein said reason field contains an entry which identifies a reason for each attempt to change a path, said reason identifying if said attempted path change was initiated at said manager node or at said agent node.

9. The packet communications network of claim 1 wherein said central management of said network is provided by a limited protocol control command structure.

10. The packet communications network of claim 9 wherein said limited protocol command structure includes Simple Network Management Protocol (SNMP).

11. The packet communications network of claim 9 wherein said limited protocol command structure includes the Common Management Information Protocol (CMIP).

12. A method for centrally managing route changes in a distributed packet communications network wherein a plurality of network nodes are interconnected by transmission links, wherein one of said nodes is designated as a manager node and all other nodes are designated as agent nodes, said method comprising the steps of:

storing information in a topology data base at said manger node concerning said plurality of network nodes and said plurality of transmission links;

determining, using information stored in the topology data base, routes through said network originating at a network node acting as a source node and terminating at another network node acting as a destination node;

storing route management information in a route management database in said manager node;

setting remotely a value in a predetermined range of values in a path table in at least one agent node acting as a source node to command said agent node to use a route determined in said manager node;

setting remotely a value outside said predetermined range of values in a path table in at least one agent node acting as a source node to authorize said agent node to determine a route to a destination node;

initiating a path change to a route originating at said at least one agent node in response to said remotely set value in said path table at said agent node; and storing the results of said initiated path change in a path status table at said at least one agent node.

13. The method of claim 12 further comprising the steps of:

adding a new entry in said path table at said each agent node for each path originating or terminating at said each agent node; and adding a new entry in each path status table at each said agent node for each path originating or terminating at said agent node.

14. The method of claim 13 wherein said path table in which said new entry is added contains a path identification field, a path specification field, a packets in field, and a packets out field.

15. The method of claim 13 wherein said path status table in which said new entry is added contains a path index field, a path identification field, a reason field, and a results field.

16. The method of claim 12 wherein a limited protocol command structure by said manager and agent nodes in providing said central management of routes in said packet communications network.

17. The method of claim 16 wherein said limited protocol command structure includes Simple Network Management Protocol (SNMP).

18. The method of claim 16 wherein said limited protocol command structure includes Common Management Network Protocol (CMIP).

* * * * *